Patented Aug. 16, 1932

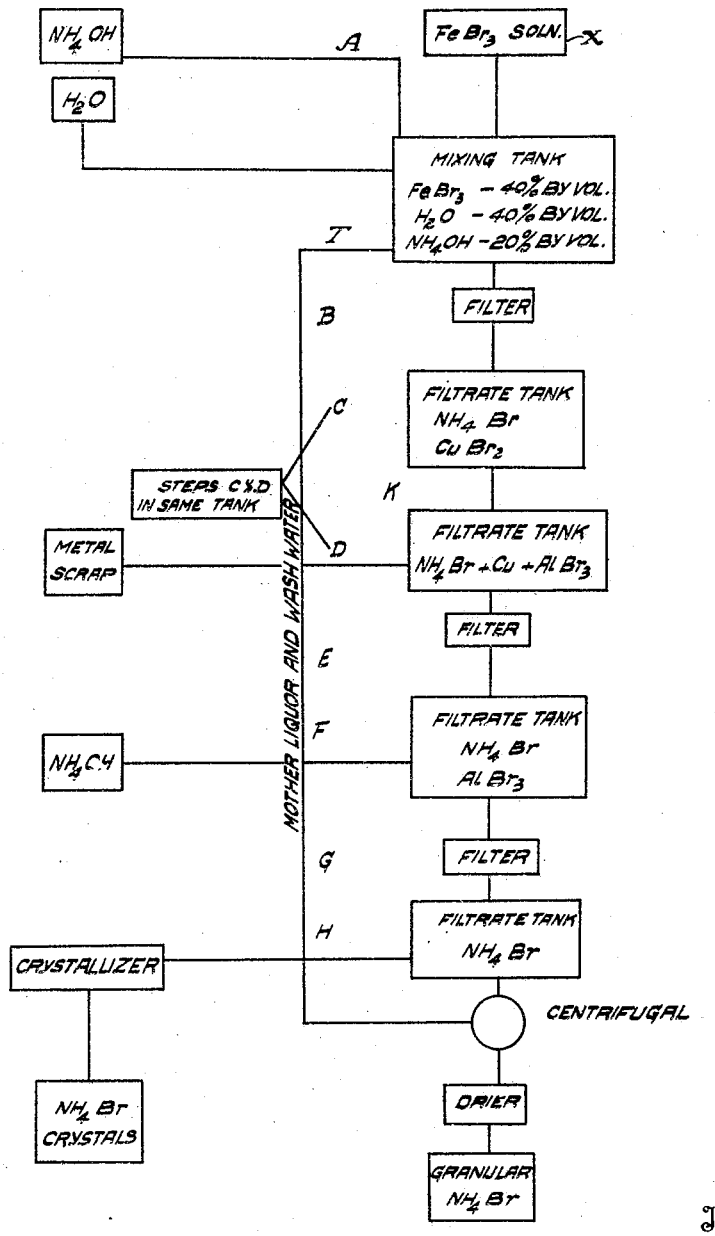

1,872,292

UNITED STATES PATENT OFFICE

CARROLL A. HOCHWALT AND JOHN B. WALIUSZIS, OF DAYTON, OHIO, ASSIGNORS TO MORTON SALT COMPANY, OF CHICAGO, ILLINOIS, A CORPORATION OF ILLINOIS

MANUFACTURE OF AMMONIUM BROMIDE

Application filed August 14, 1931. Serial No. 557,005.

This invention relates to the manufacture of ammonium bromide.

One of the principal objects of this invention is the production of substantially pure ammonium bromide from impure solutions of iron bromide.

Another object of this inventon is the production of substantially pure ammonium bromide from solutions of iron bromide containing copper.

Another object of this invention is to provide a process for the manufacture of substantially pure ammonium bromide, which is commercially practical and which is economical and satisfactory in plant operation.

Other objects and advantages of this invention will be apparent from the following description when taken in conjunction with the accompanying drawing and appended claims.

The single view of the drawing is a flow sheet of plant operation in the production of ammonium bromide according to the method of this invention.

In the practicing of this invention a solution of iron bromide is used which is obtained by treatment of bromine containing brines. The iron bromide solution, which consists largely of ferric bromide, containing small amounts of ferrous bromide, is treated with ammonium hydroxide and boiled. The iron is precipitated for the most part as ferric hydroxide with the formation of ammonium bromide, according to the following reaction:

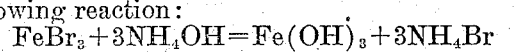

$$FeBr_3 + 3NH_4OH = Fe(OH)_3 + 3NH_4Br$$

Any ferrous bromide present in the iron bromide solution is usually oxidized during the treatment with ammonium hydroxide and subsequent boiling, so that the above reaction takes place quantitatively. Any possible remaining ferrous or ferrous-ferric hydroxide is also precipitated during this treatment. The precipitated iron is then removed by filtration or other suitable means, the ammonium bromide remaining in solution. The filtrate containing the ammonium bromide is then boiled down to the proper concentration and crystallized in crystallizing tanks, or treated to obtain a granular product. If a pure iron bromide solution is used, this procedure gives while crystals of substantially pure ammonium bromide.

In obtaining an iron bromide solution from brines, free bromine is liberated from brines, as by the action of gaseous chlorine, the free bromine is blown out by an air current and absorbed by a ferrous bromide solution, forming a ferric bromide solution which contains some ferrous bromide. Part of this ferric bromide is reduced by scrap iron to from ferrous bromide which is returned to the process and used for the absorption of free bromine. It has been found that when this procedure is followed, small amounts of heavy metals, such as copper, occurring in the scrap iron, remain in solution and contaminate the ammonium bromide, producing an undesirable color in the finished crystals. Since the cost of pure materials for this purpose is almost prohibitive, and since scrap iron is both cheap and effective, it is desirable to continue the use of scrap iron in the production of iron bromide solutions.

It has been found that when the solution of iron bromide containing small amounts of a heavy metal such as copper, is treated with ammonium hydroxide the copper or a substantial part of it, remains in the ammoniacal solution. It is found, however, that when this solution is rendered just acid to litmus, as by boiling, and then boiled with an active metal higher in the electromotive series, such as metallic aluminum, the copper is quantitatively percipitated, in such form that it may be readily separated, leaving the ammonium bromide solution substantially pure and colorless. The residual metal is removed in any desired manner and the metal remaining in solution is precipitated by any desired treatment, preferably by the addition of a slight excess of an ammonium compound, and the precipitate separated, as by filtration, leaving a pure ammonium bromide solution.

Referring to the electromotive series of metals, it is well known that in general any metal when immersed in the normally ionized salt solution of a second metal which stands well below it in the electromotive series, will cause the deposition of the second metal in the elementary or metallic state. This is true, considering as the top of the series the "reactive metals", those assigned negative potentials in the following table of normal electrode potentials according to the hydrogen scale.

*Table of normal electrode potentials*

|  | Hydrogen Scale |
|---|---|
| Potassium | −2.925 |
| Sodium | −2.715 |
| Calcium (Approx.) | −1.9 |
| Magnesium (Approx.) | −1.8 |
| Aluminum | −1.337 |
| Manganese | −1.08 |
| Zinc | −0.770 |
| Chromium (active) | −0.47 |
| Iron (active in ferrous salts) | −0.43 |
| Cadmium | −0.420 |
| Thallium (in thallous salts) | −0.34 |
| Cobalt (active) | −0.23 |
| Nickel (active) | −0.20 |
| Tin (in stannous salts) | −0.146 |
| Lead | −0.132 |
| Hydrogen (atmospheric pressure) | 0.000 |
| Copper (in cupric salts) | +0.3469 |
| Arsenic | +0.29 |
| Bismuth | +0.39 |
| Antimony | +0.47 |
| Mercury (in mercurous salts) | +0.7928 |
| Silver | +0.7987 |
| Palladium | +0.79 |
| Platinum | +0.86 |
| Gold | +1.08 |

Reference—Evans, "Metals and Metallic Compounds", Vol. 1, page 325.

That is, the so-called electro-positive metals, having negative potentials, will replace the electro-negative metals having positive potentials. Also, metals having higher negative potentials will deposit those having lower negative potentials. Aluminum, for example, deposits iron, and iron deposits copper in this manner.

We have found, in treatment of an ammonium bromide solution such as described, containing small amounts of heavy metal impurities, that active metals higher in the electromotive series than the metal present as an impurity, may be used to induce by replacement precipitation of the metallic impurity in the metallic state.

It will be obvious that where such deposition is to be made in water solutions, metals which decompose in water are not suitable for use in this manner. Accordingly such metals as sodium, potassium, calcium and magnesium are not operative in this process.

It is therefore to be understood that where the phrase "a metal higher in the electromotive series" is used herein, metals which decompose in water are excluded as not suitable for use according to this invention.

It is also well known that certain metals readily become "passive", and in the passive state do not replace other metals in this manner. For example, metallic nickel becomes passive in the air, and in such state is inoperative to replace other metals in the manner described. Accordingly, it is to be understood that only active metals are operative in this manner.

With these exceptions as above noted, active metals higher in the electromotive series are effective to deposit in the metallic state metals lower in the series. For example, aluminum, manganese, zinc, chromium, iron, cadmium, tin, and lead have been found to precipitate copper present as an impurity in iron bromide solutions. This precipitation appears to take place at or near the surface of the metal, so that the use of sheet metal, metal foil or metal scrap gives good results. The amount of metal required depends on the surface area exposed to the liquid, and it has been found that metallic aluminum, such as aluminum foil, completely removes copper from a solution of iron bromide, when used in approximately the proportion of 400 square centimeters surface area of aluminum to 1000 cc. of iron bromide solution (26° Bé.–27° Bé.) containing less than 0.01% copper as impurity. In plant operation, the proportions used will vary with conditions of plant operation, such as concentration of the iron bromide solution, amount of impurity present, metal used, etc. Optimum proportions are best determined by test under actual plant conditions.

It is also found that variations in procedure are desirable depending on the particular metal used to precipitate the metallic compound present as impurity. It is also obviously desirable for plant operation that the metal used be readily separated from the solution. For example, metallic iron may be effectively used to deposit an impurity such as copper. However, when the resulting iron containing solution is treated to remove dissolved iron, as with ammonium hydroxide, some ferrous hydroxide appears to be formed. This renders desirable an additional step of boiling in order to convert the precipitate to a filterable ferric hydroxide, followed by a filtration step. For this reason, the use of aluminum is considered somewhat preferable, since it may be readily removed by a single operation, such as precipitation with an ammonium compound and filtration. Accordingly, the use of aluminum is described in the example given. However, any suitable metal may be used if desired, and any desirable variations in procedure may readily be determined under plant operating conditions.

In producing pure ammonium bromide it is essential that care be used to prevent contamination from apparatus used. In practice enameled or tile lined tanks and evaporators have been found to give good results. Non-corrodible piping and connections are preferably used throughout the system, rubber lined piping and earthenware valves having been found satisfactory.

As an example of the carrying of this invention into effect, the following procedure is described, using a solution of iron bromide obtained in the manner above described and containing small amounts of copper in solution. The proportions given herein are illustrative only, such proportions varying with various plant operating conditions.

The iron bromide solution (concentration about 26°–27° Bé.) from a convenient storage as represented at X, is conveyed into a mixing tank A. This tank is preferably constructed of non-corrodible material, for example, enameled or tile-lined, and provided with suitable heating jacket or coils. If coils are used, they are preferably non-corrodible material. Suitable means of agitation is also provided. Ammonium hydroxide (approximately 0.943 specific gravity), and water are added to the iron bromide solution and the mixture is boiled and mixed thoroughly in a mixing tank A. The proportions of these materials as stated above, may vary with operating conditions. Good results have been obtained with approximately the following proportions:

|   | By vol. |
|---|---|
| Iron bromide solution (26°–27° Bé.) | 40% |
| Water | 40% |
| Ammonium hydroxide (Sp. g. 0.943) | 20% |

After boiling and agitating this mixture for about fifteen minutes, or until precipitation is complete, the iron hydroxide is removed, preferably by means of a conventional filter press or plate type filter B.

When an iron bromide solution containing copper is used, it has been found that the filtrate containing the ammonium bromide also contains a small amount of copper salts in solution. The filtrate is then boiled down to about 25% of its original volume, during which process the solution becomes red in color and acid in reaction. It has been found that in using aluminum to deposit copper, when the acidity of this solution is controlled so that it is barely acid to litmus (pH=5−5.6), and has a density of about 13°–14° Bé., best results appear to be obtained. When a metal such as aluminum is added to a strongly acid or alkaline solution, the metal is more actively attacked, thereby increasing expense of production and leaving in solution a larger amount of metal to be subsequently recovered. Metallic aluminum such as aluminum foil, sheet aluminum, or scrap aluminum, is then added to the filtrate tank K when the desired acidity is reached, as conveniently indicated by the density of the solution. On boiling the solution with metallic aluminum the copper is precipitated as metallic copper, leaving a clear, colorless mother liquor. This precipitation appears to take place more effectively when relatively large surfaces of aluminum are available. For this reason aluminum foil or scrap aluminum appear to be suitable for use for this purpose. The smallest amount of metal which will insure complete precipitation under the given conditions is preferably used. In the present example, about 400 square centimeters surface area of aluminum foil to 1000 cc. of the original iron bromide solution (26°–27° Bé.), was used. When the solution becomes colorless, which may require from fifteen minutes to one-half hour, the excess metallic aluminum is removed in any convenient manner, as by lifting out pieces of foil, or by removing scrap aluminum encased in a suitable basket container. The operation may be hastened, if desired, by addition of fresh metal during the boiling treatment. The precipitated copper is then removed, preferably through a conventional filter such as a bag filter E.

The filtrate consisting of a solution of ammonium bromide containing some aluminum bromide, is passed into a filter tank F. The aluminum may be separated in any desired manner, as by precipitation with an ammonium compound, such as ammonium carbonate or ammonium hydroxide. A small amount of an ammonium compound, for example, ammonium hydroxide (sp. g. 0.943), about 2 to 5% by volume, is added and the solution boiled until it is only slighty ammoniacal. The precipitated aluminum hydroxide is then removed by passing the mixture through the filter G, which may conveniently be a bag type filter. The clear filtrate, containing pure ammonium bromide in solution, is passed into the filtrate tank H, where it is concentrated to about 34° Bé.

Where granular ammonium bromide is desired this mother liquor is further concentrated in a finishing kettle or the same filtrate tank and the resulting granular ammonium bromide is separated from the mother liquor, as by centrifuge. The granular ammonium bromide may be dried in any conventional manner, as in wooden trays, and is then ready for distribution.

Where crystals are desired the solution in the filtrate tank H is usually boiled down to about 44° Bé., then run into crystallizing tanks where the ammonium bromide crystals separate out from the mother liquor. Means is provided from the centrifuge or crystallizing tanks to return mother liquor and wash water to the mixing tank T, from which they again pass through the process so that the loss of ammonium bromide is minimized.

The crystals or granular form of ammonium bromide produced in this manner are found to be substantially pure and entirely without objectionable color.

While the features herein described constitute preferred embodiments of our invention it is to be understood that the invention is not limited to these precise features, and that changes may be made therein without departing from the scope of the invention which is defined in the appended claims.

What is claimed is:

1. In the treatment of bromine-containing brines, the method which comprises treating brines to convert the bromine to an iron bromide solution containing heavy metal salt impurities, treating the iron bromide solution with ammonium hydroxide, separating the precipitated iron hydroxide, then treating the resulting solution of ammonium bromide, containing metallic salt impurities which are not separated by treatment with ammonium hydroxide, with an active metal higher in the electromotive series than the metal composing the metallic impurities in the iron bromide solution.

2. In the treatment of bromine-containing brines, the method which comprises treating brines to convert the bromine to an iron bromide solution containing heavy metal salt impurities, treating the iron bromide solution with ammonium hydroxide, separating the precipitated iron hydroxide, then treating the resulting solution of ammonium bromide, containing metallic salt impurities which are not separated by treatment with ammonium hydroxide, with an active metal higher in the electromotive series than the metal composing the metallic impurities in the iron bromide solution and which is quantitatively separated by treatment with an ammonium compound.

3. The method of producing ammonium bromide which comprises treating with ammonium hydroxide an iron bromide solution containing metallic salt impurities, and removing the metallic impurities from the resulting solution by treatment with an active metal higher in the electromotive series than the metals composing the metallic impurities.

4. In the process of making ammonium bromide, the steps of treating with ammonium hydroxide an iron bromide solution containing copper, precipitating copper by treatment with metallic aluminum, separating the precipitated copper, and precipitating the dissolved aluminum by treatment with an ammonium compound.

5. In the process of making ammonium bromide from iron bromide solutions containing copper, the step of removing the copper by treating the solution with an active metal higher in the electromotive series than copper.

6. In the process of making ammonium bromide from iron bromide solutions containing copper, the step of removing the copper by treating the solution with metallic aluminum.

7. In the process of making colorless ammonium bromide from iron bromide solutions containing copper, the step of removing the copper by treating the solution with metallic lead.

8. In the process of making pure ammonium bromide from iron bromide solutions containing copper, the steps of removing the copper by treating the solution with metallic iron, and removing the dissolved iron by treatment with an ammonium compound.

9. In the process of making ammonium bromide from iron bromide solutions containing copper, the steps of precipitating the copper in the presence of metallic aluminum, removing the unreacted aluminum and the precipitated copper, and removing the dissolved aluminum by treatment with an ammonium compound.

10. The method of producing ammonium bromide which comprises treating an iron bromide solution with ammonium hydroxide, separating the precipitated iron hydroxide, treating the filtrate with metallic aluminum, removing the undissolved aluminum, separating the precipitated copper, treating the filtrate with an ammonium compound and separating the precipitated aluminum compound.

11. The method of producing ammonium bromide which comprises treating an iron bromide solution with ammonium hydroxide, separating the precipitated iron hydroxide, treating the filtrate with metallic aluminum, removing the undissolved aluminum, separating the precipitated copper, treating the filtrate with ammonium hydroxide, separating the precipitated aluminum hydroxide and evaporating the remaining filtrate to obtain pure, colorless ammonium bromide.

12. The method of producing ammonium bromide which comprises treating an iron bromide solution with ammonium hydroxide, separating the precipitated iron hydroxide, boiling down the filtrate until slightly acid in reaction, adding metallic aluminum, boiling until the solution is colorless, removing the unreacted aluminum, separating the precipitated copper, adding ammonium hydroxide, boiling, separating the precipitated aluminum hydroxide, and evaporating the filtrate to obtain pure, colorless ammonium bromide.

13. In the treatment of bromine-containing brines, in which a ferric bromide solution is treated with iron in the production of ferrous bromide solution, the method which comprises converting the iron bromide solution to an ammonium bromide solution with precipitation and separation of iron, treatment of the ammonium bromide solution with an active metal to separate metallic salt impurities, and evaporation of the purified solution to obtain pure colorless amomnium bromide.

In testimony whereof we hereto affix our signatures.

CARROLL A. HOCHWALT.
JOHN B. WALIUSZIS.